United States Patent
Smith

(10) Patent No.: US 7,250,482 B2
(45) Date of Patent: Jul. 31, 2007

(54) SILICONE MODIFIED ACRYLICS AND EPOXIES

(75) Inventor: Stuart B. Smith, Loganville, GA (US)

(73) Assignee: Reactamine Technology, LLC, Conyers, GA (US)

(*) Notice: Subject to any disclaimer, the term of this patent is extended or adjusted under 35 U.S.C. 154(b) by 0 days.

(21) Appl. No.: 11/257,646

(22) Filed: Oct. 25, 2005

(65) Prior Publication Data

US 2006/0084767 A1    Apr. 20, 2006

Related U.S. Application Data

(60) Division of application No. 10/839,889, filed on May 5, 2004, which is a continuation-in-part of application No. 10/648,934, filed on Aug. 27, 2003.

(60) Provisional application No. 60/412,211, filed on Sep. 23, 2002, provisional application No. 60/408,797, filed on Sep. 9, 2002.

(51) Int. Cl.
    *C08G 77/22* (2006.01)
(52) U.S. Cl. ............ 528/26; 528/38; 525/100; 524/866; 524/869
(58) Field of Classification Search ............ 528/26, 528/38; 525/100; 524/866, 869
    See application file for complete search history.

(56) References Cited

U.S. PATENT DOCUMENTS 3,046,250 A * 7/1962 Plueddemann ............... 528/28
3,389,160 A * 6/1968 Reid ............... 556/423
3,954,650 A * 5/1976 Bliss ............... 252/182.13
5,759,695 A    6/1998 Primeaux, II
2004/0054112 A1    3/2004 Smith

FOREIGN PATENT DOCUMENTS

WO    WO-2004/022619    3/2004

* cited by examiner

*Primary Examiner*—Margaret G. Moore
(74) *Attorney, Agent, or Firm*—Patton Boggs LLP

(57) ABSTRACT

The present invention includes a novel polyol prepolymer including either an aliphatic amine, cycloaliphatic amine, aromatic amine or a mixture of these with an epoxy functional silicone to produce the novel polyol prepolymer chain extender. In one aspect of the invention, the novel polyol prepolymer chain extender is reacted with an epoxy resin to produce a novel silicone modified epoxy resin having improved adhesion, chemical resistance, UV stability, and decreased shrinkage properties. In another aspect of the invention, the novel polyol prepolymer chain extender is reacted with an acrylic monomer to produce a novel silicone modified acrylic resin having improved adhesion, chemical resistance, UV stability, increased functionality, and decreased shrinkage properties. The present invention also provides for a novel solid surface material composition.

15 Claims, No Drawings

SILICONE MODIFIED ACRYLICS AND EPOXIES

CROSS-REFERENCE TO RELATED APPLICATIONS

This is a divisional application of prior U.S. patent application Ser. No. 10/839,889, filed 5 May 2004, which is a continuation-in-part of application Ser. No. 10/648,934, filed 27 Aug. 2003, which claims the benefit of U.S. Provisional Application No. 60/408,797, filed 9 Sep. 2002 and U.S. Provisional Application No. 60/412,211, filed 23 Sep. 2002. The entireties of these aforementioned applications are incorporated herein by reference.

FIELD OF THE INVENTION

The present invention relates to synthetic resins and processes for making the same and more particularly, relates to methods and compositions for making aliphatic and aromatic two part polyurea elastomers, acrylics, and epoxies having improved adhesion, chemical resistance, UV stability, and decreased shrinkage properties.

PROBLEM

Conventional epoxy resins mean generally a thermosetting resin formed originally by the polymerization of bisphenol A and epicholorohydrin based on the reactivity of the epoxide group. Most epoxy resins are the two-part type which hardens when blended. Generally, epoxy resins make great adhesives, and are one of the few adhesives that can be used on metals. They're also used for applications like protective coatings, and as materials in products like electronic circuit boards and for patching holes in concrete pavement.

Epoxy resins can be formulated with different materials or blended with other epoxy resins to achieve specific performance features. Cure rates can be controlled to match process requirements through the proper selection of hardeners and/or catalyst systems. Generally, epoxies are cured by addition of an anhydride or an amine hardener as a two-part system. Different hardeners, as well as quantity of a hardener produce a different cure profile and give different properties to the finished composite.

Typical epoxy resin formulas do not however, have particularly good UV resistance. Since the viscosity of epoxy is much higher than most polyester resin, typical epoxy resin formulas are slow to cure and require a post-cure (elevated temperature) to obtain ultimate mechanical properties making epoxies more difficult to use. Others problems with typical epoxy resin formulas include brittleness and decreased flexibility when finished to a cured film. Also, typical epoxy resin formulas are not very mar or graffiti resistant and possess average adhesion properties. In addition, typical epoxy resin formulas have a functionality of two due to the available crosslinking sites.

Like epoxy resins, acrylic resins are also very useful in terms of adhesive properties and chemical resistance properties. In the form of solutions, acrylic resins serve as fixatives, picture varnishes, paints, synthetic rubber, and lightweight plastics, and in the form of water emulsions, as binders for prepared artist's tempera. Acrylic resins can be unaffected by alkalis, hydrocarbons, non-oxidizing acids, saltwater, and photographic or battery solutions. Acrylic resins also make outstanding coatings for large metal structures, such as ships and bridges. Acrylic resins are typically mixed from dry powder acrylic polymers, methyl methacrylate monomers, and usually an organic peroxide hardener of some sort.

Acrylic resins are also used to make materials, such as solid surface materials. Typically, to produce a solid surface material, such as culture marble or granite mix, unsaturated polyesters and peroxides are mixed together with granite mixes of different colors. A typical formula would include 100 PBW of unsaturated polyesters, 2% Methyl Ethyl Ketone Peroxide (peroxide catalyst), and 300 PBW granite mix. The characteristics of this typical formula include a gel time of 45 minutes and a cure time of 4-6 hours. Typical solid surface material does not have a high gloss and can not withstand high impact when dropped. Further, typical solid surface material formulas are flammable, meaning when they are subjected to high heat sources, such as propane torches, they burn and give off black smoke. Another problem of typical solid surface material formulas are that the formulas comprises 40% styrene monomers, which is an emission that the EPA regulates, and thus requires stringent operating conditions to conform to environmental standards. Yet another problem of solid surface material made with conventional formulas including unsaturated polyesters and peroxides, is that the material generally has a strong styrene monomer odor after curing and mars very easily.

Conventional polyurea coatings typically possess several characteristics that have made them desirable as a seamless membrane including fast, consistent reactivity and cure, moisture and temperature insensitivity during application, exceptional elastomeric quality, hydrolytically stable (i.e. low water absorption), high thermal stability, and that they are auto catalytic and do not emit solvents or VOC's when applied. However, many characteristics of conventional polyureas are unfavorable and limit their use in many applications.

The conventional aromatic polyurea uses mixtures of aromatic diamines such as diethyltoluenediamine and polyether amines reacted with an methylene diphenyl isocyanate (MDI) prepolymer with optional levels of propylene carbonate added. This material reacts in 5 seconds to produce a polyurea. A conventional aliphatic polyurea can be made with aliphatic isocyanate reacted with aliphatic amines, such as Jeffamine T403, D400, D2000 from Huntsman or NH 1220 and NH 1420 from Bayer. This reaction is very fast with gel times of 5 seconds. Both the conventional aromatic and aliphatic polyureas are attacked by strong solvents such as xylene, toluene, acetone, low pH acids, and high pH caustics.

Another undesirable characteristics of conventional polyureas is that conventional polyureas possess poor adhesion properties. Specifically, the fast reaction times inherent in conventional polyureas cut short the time needed for a conventional polyurea to penetrate and adhere to its substrate. Commercial epoxy type resins have been used in place of conventional polyureas because they are slow to react but penetrate to give excellent adhesion and chemical resistance.

Yet another problem of conventional polyureas and epoxies is that they do not possess good color stability or UV resistance. Aromatic polyureas, due to their aromatic reactants, generally turn yellow or brown when exposed to ultraviolet (UV) light and oxygen. Since polyureas can be formulated in a variety of colors, this discoloration trait adversely affects the intended finish color of the conventional polyurea, especially in light colors. Also, conventional polyureas shrink about 1%-1.5% when they cure, which means, for example, when 1,000 linear feet of polyurea is applied to a roofing project, once it cures, some 10 to 15 feet of polyurea will shrink and need to be reapplied.

Information relevant to attempts to address these problems can be found in the U.S. Pat. Nos. 5,731,397 issued 24 Mar. 1998 to Primeaux and 5,962,618 issued 5 Oct. 1999 to Primeaux.

Therefore, there is a need for epoxy resins and acrylic resins with a silicone backbone that would increase chemical resistance, UV stability, adhesion, and decreased shrinkage properties. Furthermore, there is a need for epoxy resins and acrylic resins that are not susceptible to non-homogeneous mixtures that provide epoxy resins and acrylic resins in differing consistencies and properties.

SOLUTION

The above described problems are solved and a technical advance achieved in the art by a polyol prepolymer chain extender with aliphatic epoxy end groups that can react with either an aliphatic amine, an aromatic amine, a cycloaliphatic amine or a combination of these. The polyol prepolymer chain extender is then mixed with epoxy resin reactants to form silicone modified epoxy resins, which significantly improves the characteristic of the epoxy resin. In another aspect, the polyol prepolymer chain extender is mixed with a multi-functional acrylic monomer to form silicone modified acrylic resins.

The polyol prepolymer chain extender can be either aliphatic, aromatic, cycloaliphatic or any combination of these. The polyol prepolymer chain extender is preferably prepared prior to mixing with either the epoxy resin or the multi-functional acrylic monomer. By reacting an epoxy silicone with a primary amine, epoxy and acrylic resins are produced which include a silicone backbone for improved properties.

The novel polyol prepolymer chain extenders produce epoxies and acrylics with improved characteristics, such as improved UV stability and resistance, improved adhesion, excellent chemical and mar resistance, better flow, elongation improvement, hardening, improved graffiti resistance, and improved impact resistance.

In addition, solid surface material formulas prepared with the novel polyol prepolymer chain extenders have higher gloss finish, better gel and cure times, improved mar resistance, better flame resistance, and greater impact resistance. Further, these improved solid surface material formulas are able to accommodate higher concentrations of granite mix, while remaining fluid.

DETAILED DESCRIPTION OF THE INVENTION

Polyureas typically have A-component reactants and B-component reactants that are kept in separate containers or vessels, due to their reactivity, and are mixed just prior to being applied to a substrate. Conventionally, the A-component reactants include a polyisocyanate and the B-component reactants include an amine terminated polyol.

The present invention B-component reactants include a novel polyol prepolymer chain extender that includes at least one amine reacted with an epoxy functional silicone. In one aspect of the present invention, the polyol prepolymer chain extender includes a silicone that has an epoxy end group which reacts with an aromatic or aliphatic amine or combination of aromatic and aliphatic amines to produce the novel polyol prepolymer chain extender. In one aspect of the present invention, the epoxy end group on the silicone is aliphatic and more preferably is glycidyl ether. The aliphatic epoxy end group provides increased UV and color stability of the silicone modified polyurea. Exemplary epoxy functional silicones include 2810 from OSI Specialties and SILRES© HP 1000 from Wacker Chemicals Corp. Both products have Hydrogen equivalent weights of 300-400. One non-limiting example of an epoxy functional silicone is shown in formula (I):

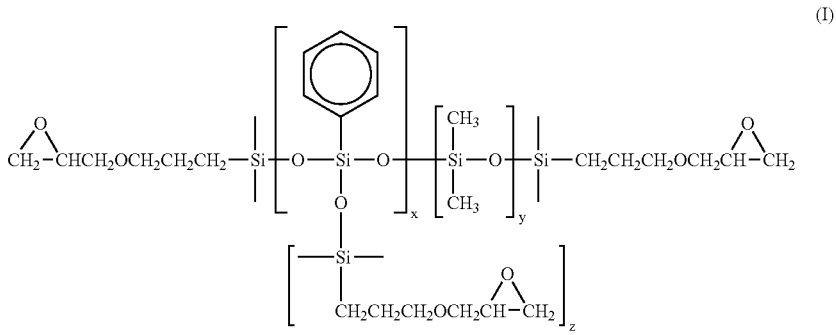

The amines of the B-component polyol prepolymer chain extender preferably include primary and secondary amines reacted with the epoxy functional silicone. In one aspect of the polyol prepolymer chain extender, the aliphatic primary amines are low molecular weight amines, such as D230, D400, or T403 from Huntsman, polyaspartic amines, such as NH 1220 and NH 1420 from Bayer, and dimethylthiotoluenediamine (DMTDA), 3,5-dimethylthio-2,6-toluenediamine or 3,5-dimethylthio-2,4-toluenediamine, such as E-300 from Albermarle Corporation. In addition, aromatic amines may be used in the polyol prepolymer chain extender, such as diethyltoluenediamine (DETDA) E-100 Ethacure from Albemarle Corporation. In one aspect of the present polyol prepolymer chain extender, these amines are used in combination with one another or separately, when reacted with an epoxy functional silicone. The gel and tack free time for the two component silicone modified polyurea can be adjusted by using different combinations and amounts of these amines with the epoxy functional silicone during the preparation of the polyol prepolymer chain extender. For example to produce a silicone modified polyurea with fast gel and tack free time, a polyol prepolymer chain extender is prepared including D400 and E-100 which is reacted with an epoxy functional silicone prior to mixing with the polyisocyanate. Conversely, for slower gel and tack free time, a polyol prepolymer chain extender is prepared including NH1220 and D400 which is reacted with an epoxy functional silicone. Some non-limiting examples of the aliphatic primary amines are shown in formulas (II), (III), and (IV):

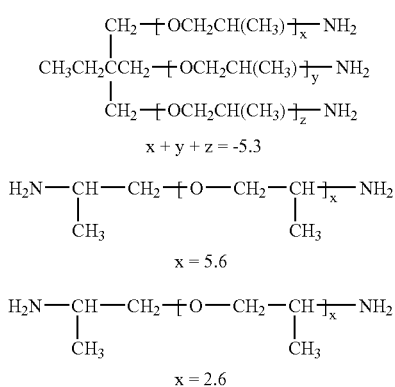

The following chart shows the hydrogen equivalent weights of some these non-limiting aliphatic primary amines.

| Product | Equivalent/gm for Epoxy | Equivalent/gm for Urea |
|---|---|---|
| T-403 | 80 | 115 |
| D-400 | 115 | 230 |
| D-230 | 60 | 115 |

In addition to the novel polyol prepolymer chain extender herein described, the B-component of the present silicone modified polyurea also preferably includes high molecular weight amine-terminated polyethers or simply polyether amines. The term "high molecular weight" is intended to include polyether amines having a molecular weight of at least about 2000. Particularly preferred are the JEFFAMINE® series of polyether amines available from Huntsman Corporation; they include JEFFAMINE D-2000, JEFFAMINE D4000, JEFFAMINE T-3000 and JEFFAMINE T-5000.

In addition, the B-component of the silicone modified polyurea also preferably includes addition amounts of curative amines, such as E-100 Ethacure from Albermarle. Also preferably, aromatic diamines, such as Unilink 4200 from UOP, which is a secondary amine, are added to the B-component to help control the cross-linking and reactivity of the silicone modified polyurea.

In addition, the 1-component preferably includes at least one coupling agent, such as A1100 (amino propyl silane). The coupling agent is typically a silane with amine on the end of it so it become reactive as part of the structure. Other coupling agents that can be used are glycidylether silane, such as A-187 from OSi Specialties, Inc., which is a polyglyceride.

Also, pigments, for example titanium dioxide, may be incorporated in the B-component, to impart color properties to the silicone modified polyurea. Typically, such pigments are added with the in the B-component prior to mixing with the A-component. A non-limiting example of a titanium dioxide pigment is Ti-Pure® R-900 rutile titanium dioxide from E.I. DuPont de Nemours Co.

In addition, UV stabilizer materials are also preferably mixed with the B-components, to impart better UV resistance to the silicone modified polyurea. Some non-limiting examples of UV stabilizers are Tinuvin® 328 and Tinuvin® 765 from Ciba-Geigy Corp.

The aliphatic and/or aromatic silicone modified polyurea of the present invention typically includes an A-component, such as an isocyanate, which may be an aliphatic or aromatic isocyanate. The aliphatic isocyanates are known to those in the art. For instance, the aliphatic isocyanates may be of the type described in U.S. Pat. No. 4,748,192, incorporated by reference herein. Accordingly, they are typically aliphatic diisocyanates, and more particularly are the trimerized or the biuretic form of an aliphatic diisocyanate, such as, hexamethylene diisocyanate (HMDI), or the bifunctional monomer of the tetraalkyl xylene diisocyanate, such as tetramethyl xylene diisocyanate (TMXDI). Cyclohexane diisocyanate is also to be considered a preferred aliphatic isocyanate. Other useful aliphatic polyisocyanates are described in U.S. Pat. No. 4,705,814, also incorporated by reference herein. They include aliphatic diisocyanate, for example, alkylene diisocyanate with 4 to 12 carbon atoms in the alkylene radical, such as 1,12-dodecane diisocyanate and 1,4-tetramethylene diisocyanate. Also described are cycloaliphatic diisocyanates, such as 1,3- and 1,4-cyclohexane diisocyanate as well as any desired mixture of these isomers; 1-isocyanato-3,3, 5-trimethyl-5-isocyanatomethylcyclohexane (isophorone diisocyanate); 4,4'-, 2,2'- and 2,4'-dicyclohexylmethane diisocyanate, as well as the corresponding isomer mixtures, and the like. Exemplary isocyanate monomers include monoisocyanate compound (p=1) such as m- or p-isopropenyl-α, α dimethylbenzoyl isocyanate.

Aromatic isocyanates may also be employed. Suitable aromatic polyisocyanates include, but are not necessarily limited to m-phenylene diisocyanate; p-phenylene diisocyanate; polymethylene polyphenylene diisocyanate; 2,4-toluene diisocyanate; 2-6 toluene diisocyanate; dianisidine diisocyanate, bitolylene diisocyanate; naphthalene-1,4-diisocyanate; diphenylene 4,4'-diisocyanate and the like. Suitable aliphatic/aromatic diisocyantes, include, but are not necessarily limited to xylylene-1,3-diisocyanate, bis(4-isocyanatophenyl)methane; bis(3-methyl-4-isocyanatophenyl) methane; and 4,4'-diphenylpropane diisocyanate. The aforestated isocyanates can be used alone or in combination. In one embodiment of the invention, aromatic isocyanates are preferred.

The isocyanate compound used in the present invention has a structure wherein all of the isocyanate (NCO) groups in the molecule have secondary or tertiary carbon bonded thereto. The groups other than the NCO group bonding to the secondary or the tertiary carbon are not limited, for example, in terms of the number of carbon atoms, bulkiness, inclusion of hetero atoms such as O, S, and N, and the like. The two groups bonding to the tertiary carbon may be either the same or different from each other.

When producing a polyol prepolymer chain extender or an isocyanate prepolymer, it is necessary have to have an adduct or excess amount of amine to keep the reactants liquid. This also means that the adduct or excess of amine reacts with the isocyanate prepolymer when making the final silicone modified polyurea. This requires carefully adjusting of the amine level, so that the speed of reactivity and conversion are controlled. Therefore, when mixing an A-component and a B-component together, it is preferable to include 105% stoichiometrically of the A-component compared to the B-component. This means a 5% stoichiometric excess of polyisocyanates are preferably used in the mixtures. This is done because any excess isocyanate will moisture cure.

This careful attention to the amine adduct is also important during application to a substrate, such as spraying. The viscosity of the mix at the tip of the application device, such as an impingement gun, is very important, because if the viscosity is too high then the internal mix with the A-component reactants and the B component reactants is inadequate for a consistent silicone modified polyurea. Furthermore, if the viscosity is too high, then additional heat may be required to raise the temperatures of the reactants to bring the viscosity down low enough to spray.

Three non-limiting examples of the novel polyol prepolymer chain extender are shown in formulas (V), (VI), and (VII):

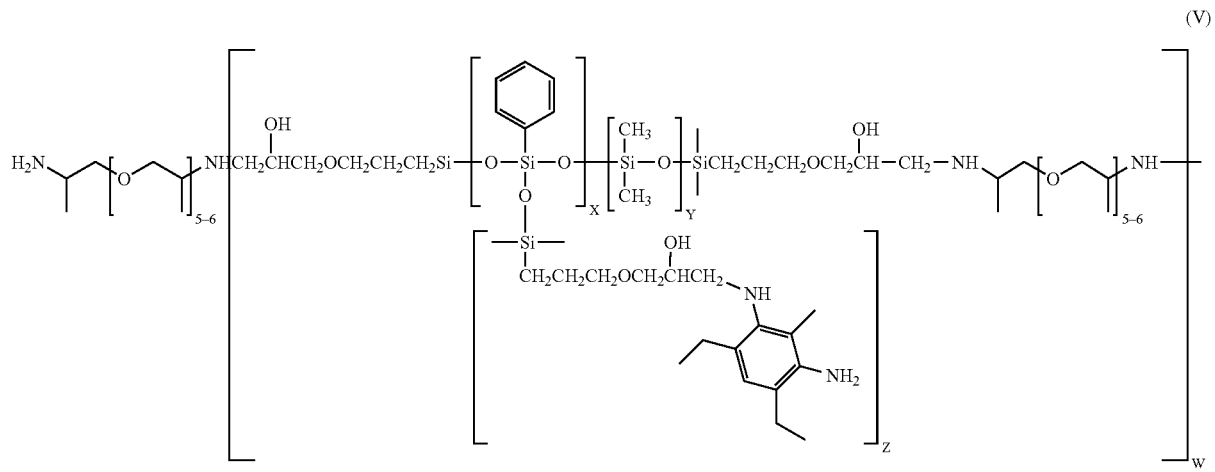

(V)

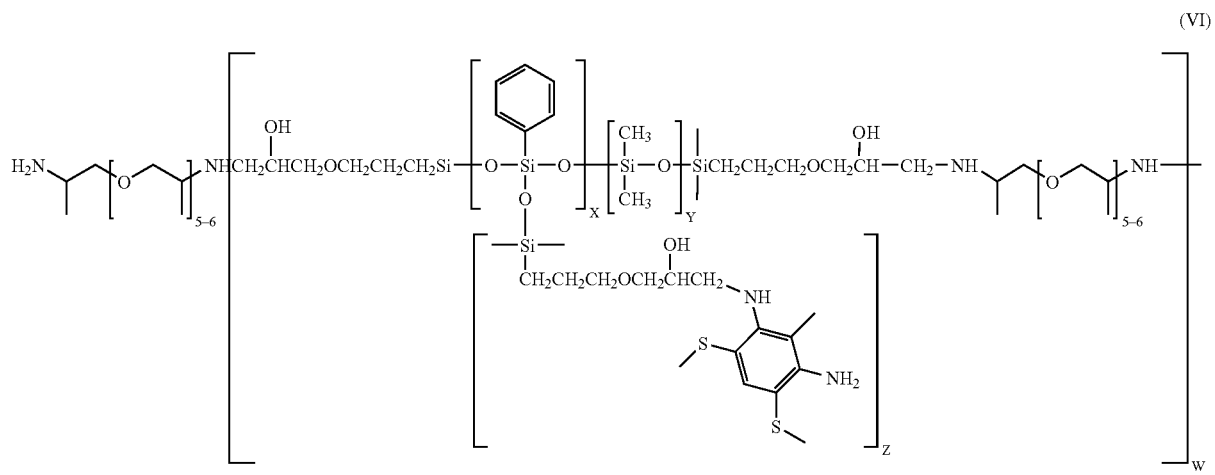

(VI)

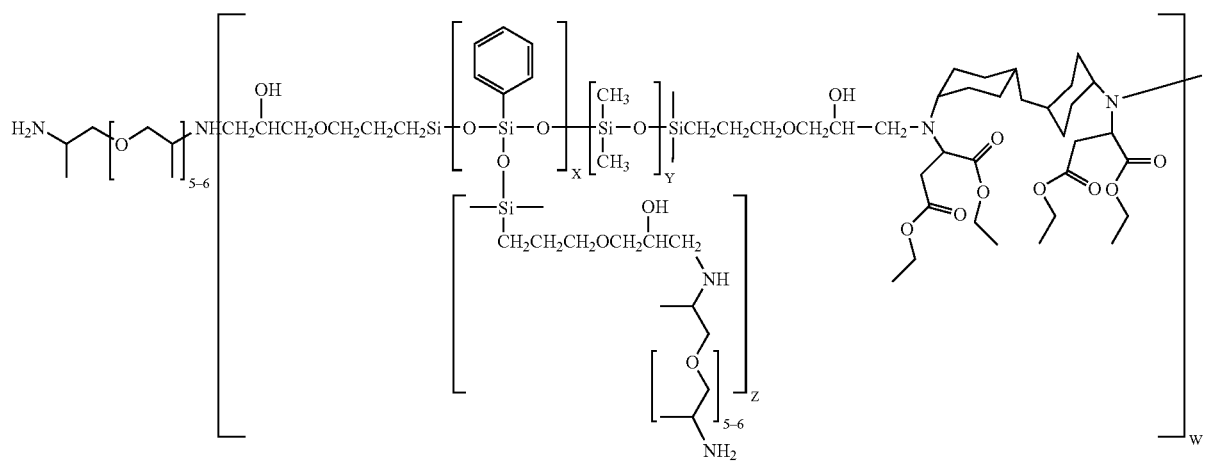

(VII)

where the values of W, X, Y, and Z in formulas (V), (VI), and (VII) are as follows. The value for X is a number greater than or equal to 1, and preferably X is in the range of from 1 to 10, and more preferably, X is equal to 1. The value for Z is a number greater than or equal to 1. The value for Y is a number greater than or equal to 1, and preferably Y is in the range or from 10-200, and more preferably Y is between 5 and 7. The value for W is a number greater than or equal to 1.

Two non-limiting examples of the novel silicone modified polyurea are shown in formulas (VIII) and (IX):

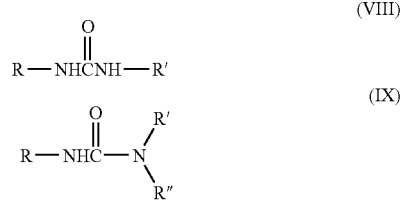

where R, R', and R" groups are the novel polyol prepolymer chain extenders described herein.

The following examples are provided to further illustrate the preferred embodiments of the present invention polyol prepolymer chain extender, but should not be construed as limiting the invention in any way. Compositions of the polyol prepolymer chain extender were produced by mixing amines with an epoxy functional silicone polymer shown in Examples 1-7. The following amines were reacted with the following silicone polymers noted in Table 1.

TABLE 1

|  | Examples | | | | | | |
|---|---|---|---|---|---|---|---|
|  | 1 | 2 | 3 | 4 | 5 | 6 | 7 |
| T-403 | 300 | — | — | — | — | — | — |
| 2810 or HP1000 | 100 | 100 | 100 | 100 | 100 | 100 | 100 |
| D400 | — | 300 | 300 | — | — | 300 | 300 |

TABLE 1-continued

|  | Examples | | | | | | |
|---|---|---|---|---|---|---|---|
|  | 1 | 2 | 3 | 4 | 5 | 6 | 7 |
| E-100 | — | — | 500 | — | 500 | — | — |
| D230 | — | — | — | 300 | 300 | — | — |
| E-300 | — | — | — | — | — | 500 | — |
| NH1220 | — | — | — | — | — | — | 400 |

All amounts of the compounds in Table 1 are represented by parts by weight. The reactions between the amines and the epoxy functional silicone polymer are slow and produce a low exotherm. In one aspect of the present invention, to increase reaction times of these reactants in Examples 1-7, the reactants are heated to a minimum temperature from 130° F. to 210° F., preferably 180° F., for two hours with an excess of amine to keep the product liquid, as provided in the Table 1. In another aspect of the present invention, the heating periods are between 30 minutes to 24 hours. In one aspect of the present invention the polyol prepolymer chain extender was allowed to cool prior to mixing with other reactants, described herein, in the B-component formula. In another aspect of the present invention, all reactants of the B-component formula, described herein, are mixed together and heated from 130° F. to 210° F., preferably 180° F., for a minimum of 30 minutes. The excess amount of amine can be adjusted to suit the purpose of a specific application. It is understood that increased amounts of silicone are better for polyurea performance. The polyisocyanate is preferably prepared using a 2000 molecular weight (mwt) silicone diol reacted with an isocyanate to form a polyurea prepolymer with better chemical and UV resistance when its product is reacted to the silicone modified polyol side. Silicone 2812 from OSI is a 2000 mwt diol with 1000 eq. Wt.

Examples of the prepolymer are as follows in Examples 8-9.

EXAMPLE 8

A 22% NCO aliphatic dimer such as N-3400 (Bayer) is reacted with 2812 (OSI) silicone at a ratio of:

| | |
|---|---|
| 80 PBW | N3400 |
| 20 PBW | 2812 |

All amounts are represented by parts by weight. This product is heated at 150° F. for two hours. The results are an 18% NCO polyurea prepolymer with silicone in the backbone.

EXAMPLE 9

A 29% NCO aromatic urethane isocyanate, ICI Huntsman 1680, is reacted with 2812 silicone at a ratio of:

| | |
|---|---|
| 60 PBW | 1680 |
| 40 PBW | 2812 |

All amounts are represented by parts by weight. This product was heated at 180° F. for two hours. The result is a 16% NCO polyurea prepolymer with silicone in the backbone.

Examples of silicone modified polyureas are given below in Examples 10-15.

EXAMPLE 10

Aliphatic Silicone Polyurea

An aliphatic silicone modified polyurea was prepared with 15 PBW T-403/2810 adduct (Example 1), 75 PBW NH1220 (Bayer) polyaspartic ester, 10. PBW pigment white (TiO$_2$), 1 PBW T-292 UV stabilizer, and 0.8 PBW A 1100 silane coupling agent. This constitutes the B-component of the aliphatic silicone modified polyurea. This was mixed to 110 PBW of polyurea prepolymer of Example 8. This aliphatic silicone modified polyurea has a gel time of about 45 seconds when spray applied by a Gusmer H2035 spray machine. The product was spray applied to a concrete and metal panel and checked for adhesion and placed in a weathermeter for UV stability.

EXAMPLE 11

Another Aliphatic Polyurea without Silicone

An aliphatic modified polyurea was prepared with 15 PBW T403, 75 PBW NH1220 (Bayer) polyaspartic ester, 10 PBW pigment white (TiO$_2$), 1 PBW T-292 UV stabilizer, and 18 PBW A1100 silane coupling agent. This constitutes the B-component of the aliphatic modified polyurea. This was mixed to 110 PBW of polyurea prepolymer consisting of N3400 and D2000 Jeffamines mixed to 18% NCO. This aliphatic modified polyurea has a gel time of approximately 15 seconds when spray applied by a Gusmer H2035 spray machine. The product was spray applied to a concrete and metal panel and checked for adhesion and placed in a weathermeter for UV stability.

EXAMPLE 12

Aromatic Polyurea

An aromatic polyurea was prepared with 15 PBW E-100 diethyltoluenediamine (DETDA), 10 PBW D400, and 75 PBW D2000. This constitutes the B-component of the aromatic silicone modified polyurea. This was mixed to 110 PBW of polyurea prepolymer consisting of a Huntsman 9484 prepolymer MDI with 16% NCO. This aromatic silicone modified polyurea has a gel time of approximately 5 seconds when spray applied by a Gusmer H2035 spray machine. The product was spray applied to a concrete and metal panel and checked for adhesion and placed in a weathermeter for UV stability.

EXAMPLE 13

Aromatic Polyurea with Silicone

An aromatic silicone modified polyurea was prepared with 25 PBW D400/2810/E-100 (Example 3), 75 PBW D2000. This constitutes the B-component of the aromatic silicone modified polyurea. This was mixed to 110 PBW of polyurea prepolymer consisting of a Huntsman 9484 prepolymer MDI with 16% NCO. This has a gel time of approximately 10 seconds when spray applied by a Gusmer H2035 spray machine. The product was spray applied to a concrete and metal panel and checked for adhesion and placed in a weathermeter for UV stability.

EXAMPLE 14

Another Aromatic Polyurea with Silicone

An aromatic silicone modified polyurea with silicone was prepared with 15 PBW E-100 diethyltoluenediamine (DETDA), 10 PBW D400/2810 adduct (Example 2), and 75 PBW D2000. This constitutes the B-component of the aromatic silicone polyurea. This was mixed to 110 PBW of polyurea prepolymer of 29% NCO aromatic urethane isocyanate (Example 9). This aromatic silicone modified polyurea has a gel time of approximately 8 seconds when spray applied by a Gusmer H2035 spray machine. The product was spray applied to a concrete and metal panel and checked for adhesion and placed in a weathermeter for UV stability.

EXAMPLE 15

Another Aromatic Polyurea with Silicone

An aromatic silicone modified polyurea with silicone was prepared with 25 PBW E-100/D400/HP1000 (Example 3), 75 PBW D2000. This constitutes the B-component of the aromatic silicone modified polyurea. This was mixed to 110 PBW of polyurea prepolymer of 29% NCO aromatic urethane isocyanate (Example 9). This aromatic silicone modified polyurea has a gel time of approximately 12 seconds when spray applied by a Gusmer H2035 spray machine. The product was spray applied to a concrete and metal panel and checked for adhesion and placed in a weathermeter for UV stability.

The compositions of Examples 10-15 were evaluated and are shown in Table 2.

TABLE 2

| Examples | Adhesion PSI Concrete | Steel | UV Results in 1000 Hrs |
|---|---|---|---|
| 10 | 400 | 1200 | Excellent |
| 11 | 309 | 1000 | Slight Yellow |
| 12 | 350 | 1250 | Yellow/Brownish |
| 13 | 400 | 1275 | Yellow |
| 14 | 450 | 1375 | Slight Yellow |
| 15 | 475 | 1400 | Very Slight Yellow |

The above UV results were achieved by using a B-bulb on a QUV machine. Also the adhesion results were performed using ASTM #4551 elcometer. The adducts in which E-100, silicone, and polyether amine that were pre-heated show better adhesion and UV resistance then when E-100 is added without being reacted.

The compositions of Examples 10-15 were evaluated for chemical resistance and are shown in Table 3.

TABLE 3

| Examples | Xylene | Toluene | Acetone | MEK | $H_2SO_4$ (50%) | HCl (50%) | $H_3PO_4$ (50%) | Caustic |
|---|---|---|---|---|---|---|---|---|
| 10 | R | R | R | R | R | R | R | R |
| 11 | RC | RC | RC | NR | NR | NR | NR | NR |
| 12 | RC | RC | RC | NR | NR | NR | NR | NR |
| 13 | RC | RC | RC | NR | NR | NR | NR | NR |
| 14 | R | R | R | R | R | R | R | R |
| 15 | R | R | R | R | R | R | R | R |

All samples in Table 3 were placed in a glass cover for 48 hours with the chemical on the surface of the sample. R=Recommended, RC=Recommended conditional, NR=Not recommended Additional examples of silicone modified polyureas are given below. Comparative examples 16-18 are conventional ratios and compositions and do not include any polyol prepoymer. Examples 19-20 are examples of the present silicone modified polyurea and do include amounts of different combinations and ratios of the novel polyol prepolymer chain extenders.

COMPARATIVE EXAMPLES 16-17 AND EXAMPLES 18-20

TABLE 4

| | Examples | | | | |
|---|---|---|---|---|---|
| | 16 | 17 | 18 | 19 | 20 |
| Polyol prepolymer chain extender of Example 3 | — | — | — | — | 25 |
| D2000 (Jeffamine) | 50 | 50 | 45 | 45 | 45 |
| T-5000 (Jeffamine) | 10 | 10 | 10 | — | — |
| Polyol prepolymer chain extender of Example 7 | — | — | — | 10 | 10 |
| E100 (Ethacure) | 25 | 15 | 15 | 15 | — |
| 4200 (Unilink) | — | 10 | — | — | — |
| A-187 | 0.4 | 0.4 | 0.4 | 0.4 | 0.4 |
| 15.5% NCO Index | 105 | 105 | 105 | 105 | 105 |
| Gel Time (Sec) | 3.5 | 4.8 | 5.0 | 4.5 | 4.5 |
| Tack Free (Sec) | 5.5 | 7.5 | 7.5 | 6.5 | 7.5 |

Physical Property Testing

Physical property testing for the silicone modified polyureas noted in Table 4 were done in accordance with American Society for Testing and Materials (ASTM). The ASTM test methods and their physical property test descriptions are given below in Table 5:

TABLE 5

| | Examples | | | | |
|---|---|---|---|---|---|
| | 16 | 17 | 18 | 19 | 20 |
| Tensile Strength PSI ASTM D-638 | 2541 | 2430 | 2516 | 3350 | 3620 |
| % Elongation ASTM D-638 | 235 | 265 | 410 | 340 | 300 |

TABLE 5-continued

| | Examples | | | | |
|---|---|---|---|---|---|
| | 16 | 17 | 18 | 19 | 20 |
| Tear Strength P.L.I. ASTM D-624 | 357 | 340 | 500 | 525 | 610 |
| Shore Hardness D ASTM D2240-81 | 47/40 | 47/40 | 47/40 | 47/40 | 50/45 |
| Abrasion HS-18 Wheel (mg) 1000 gm - 1000 cycle loss ASTM D-4060 | 0.6 | 0.6 | 0.4 | 0.4 | 0.4 |
| Elcometer PSI | — | — | — | — | — |
| Concrete | 450 | 375 | 750 | 900 | 950 |
| Steel ASTM 4551 | >1000 | >1000 | >1300 | >1500 | >1500 |
| Moisture Vapor Transmission (Perms) ASTM E96-80 | <0.1 | <0.1 | <0.1 | <0.1 | <0.1 |
| Water Absorption (%) WT Gain ASTM D570-95 | 1.90 | 2.20 | 1.25 | 0.85 | 0.85 |

Additional examples of silicone modified polyureas are given below. Comparative examples 21-22 are conventional ratios and compositions and do not include any polyol prepolymer. Examples 23-24 are examples of the present silicone modified polyurea and do include amounts of different combinations and ratios of the novel polyol prepolymer chain extenders.

COMPARATIVE EXAMPLES 21-22 AND EXAMPLES 23-24

TABLE 6

| | Examples | | | |
|---|---|---|---|---|
| | 21 | 22 | 23 | 24 |
| D2000 (Jeffamine) | 50 | 50 | 45 | 45 |
| T-5000 (Jeffamine) | 10 | 10 | 10 | — |
| Polyol prepolymer chain extender of Example 7 | — | — | 10 | — |
| Polyol prepolymer chain extender of Example 6 | — | — | — | 25 |
| E100 (Ethacure) | 25 | 15 | 15 | — |
| 4200 (Unilink) | — | 10 | — | — |
| A-187 | 0.4 | 0.4 | 0.4 | 0.4 |
| 15.5% NCO Index | 105 | 105 | 105 | 105 |
| Gel Time (Sec) | 3.5 | 4.8 | 5.0 | 35.0 |
| Tack Free (Sec) | 5.5 | 7.5 | 7.5 | 50.0 |

Physical Property Testing

Physical property testing for the silicone modified polyureas noted in Table 6 were done in accordance with American Society for Testing and Materials (ASTM). The ASTM test methods and their physical property test descriptions are given below in Table 7:

TABLE 7

| | Examples | | | |
|---|---|---|---|---|
| | 21 | 22 | 23 | 24 |
| Tensile Strength PSI ASTM D-638 | 2541 | 2430 | 2516 | 3350 |
| % Elongation ASTM D-638 | 235 | 265 | 410 | 340 |
| Tear Strength P.L.I. ASTM D-624 | 357 | 340 | 500 | 525 |
| Shore Hardness D ASTM D2240-81 | 47/40 | 47/40 | 47/40 | 47/40 |
| Abrasion HS-18 Wheel 1000 gm - 1000 cycle ASTM D-4060 | 0.6 mg loss | 0.6 mg loss | 0.4 mg loss | 0.4 mg loss |
| Elcometer PSI | — | — | — | — |
| Concrete | 450 | 375 | 750 | 900 |
| Steel ASTM 4551 | >1000 | >1000 | >1300 | >1500 |
| Moisture Vapor Transmission (Perms) ASTM E96-80 | <0.1 | <0.1 | <0.1 | <0.1 |
| Water Absorption WT Gain ASTM D570-95 | 1.90% | 2.20% | 1.25% | 0.85% |

Additional examples of silicone modified polyureas are given below. Comparative examples 25-26 are conventional ratios and compositions and do not include any polyol prepoymer. Examples 27-28 are examples of the present silicone modified polyurea and do include amounts of different combinations and ratios of the novel polyol prepolymer chain extenders.

COMPARATIVE EXAMPLES 25-26 AND EXAMPLES 27-28

TABLE 8

| | Examples | | | |
|---|---|---|---|---|
| | 25 | 26 | 27 | 28 |
| D2000 (Jeffamine) | 50 | 50 | 45 | 45 |
| T-5000 (Jeffamine) | 10 | 10 | 10 | — |
| Polyol prepolymer chain extender of Example 7 | — | — | 10 | 10 |
| E100 (Ethacure) | 25 | 15 | 15 | 15 |
| 4200 (Unilink) | — | 10 | — | — |
| A-187 | 0.4 | 0.4 | 0.4 | 0.4 |
| 15.5% NCO Index | 105 | 105 | 105 | 105 |
| Gel Time (Sec) | 3.5 | 4.8 | 5.0 | 4.5 |
| Tack Free (Sec) | 5.5 | 7.5 | 7.5 | 6.5 |

Physical Property Testing

Physical property testing for the silicone modified polyureas noted in Table 8 were done in accordance with American Society for Testing and Materials (ASTM). The ASTM test methods and their physical property test descriptions are given below in Table 9:

TABLE 9

| | Examples | | | |
|---|---|---|---|---|
| | 23 | 24 | 25 | 26 |
| Tensile Strength PSI ASTM D-638 | 2541 | 2430 | 2720 | 3610 |
| % Elongation ASTM D-638 | 235 | 265 | 420 | 350 |
| Tear Strength P.L.I. ASTM D-624 | 357 | 340 | 510 | 550 |
| Shore Hardness D ASTM D2240-81 | 47/40 | 47/40 | 47/40 | 47/40 |
| Abrasion HS-18 Wheel 1000 gm - 1000 cycle ASTM D-4060 | 0.6 mg loss | 0.6 mg loss | 0.4 mg loss | 0.4 mg loss |
| Elcometer PSI | — | — | — | — |
| Concrete | 450 | 375 | 750 | 900 |
| Steel ASTM 4551 | >1000 | >1000 | >1300 | >1500 |
| Moisture Vapor Transmission (Perms) ASTM E96-80 | <0.1 | <0.1 | <0.1 | <0.1 |
| Water Absorption WT Gain ASTM D570-95 | 1.90% | 2.20% | 1.25% | 0.85% |

In addition to that disclosed above, the novel polyol prepolymer chain extenders can be used as chain extenders for other types of reactions to produce acrylics, epoxies, and other materials.

In one aspect of the present invention, the novel polyol prepolymer includes reacting an epoxy functional silicone with an amine, such as an aliphatic, aromatic, cycloaliphatic amines, or combinations of these. In addition, mixtures of different aliphatic amines may be reacted with an epoxy functional silicone to produce the novel polyol prepolymer. Exemplary cycloaliphatic amines include 3-aminomethyl-3,5,5-trimethylcyclohexylamine (also known as isophoronediamine or IPDA), 1,3-Bis(aminomethyl)benzene (also known as metaxylylenediamine or MXDA), and 1,2-Diaminocyclohexane, such as Dytek® DCH-99 from Invista. Exemplary aromatic amines include diethyltoluenediamine (DETDA) E-100 Ethacure and dimethylthiotoluenediamine (DMTDA), 3,5-dimethylthio-2,6-toluenediamine or 3,5-dimethylthio-2,4-toluenediamine, such as E-300 from Albermarle Corporation. An exemplary aliphatic amine includes 2-Methylpentamethylenediamine (MPMD), such as Dytek® A Amine from DuPont. Several non-limiting examples of the aliphatic and cycloaliphatic amines are shown in formulas (X), (XI), (XII), and (XIII):

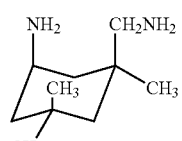
(X)

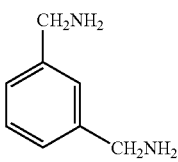
(XI)

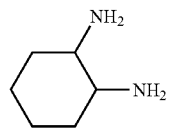
(XII)

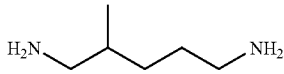
(XIII)

The aliphatic and cycloaliphatic amines are mixed with an epoxy functional silicones such as SILRES® HP 1000 at a weight ratio of 3:1 amine to silicone. Blends of these reacted silicone amines may also be made to alter the epoxy's properties when reacted with the epoxy resins.

Exemplary epoxy resins include diglycidyl ether of bisphenol A epoxy resin, such as Shell EPON 828 epoxy resin and bisphenol F epoxy resin. One non-limiting example of an epoxy resin is shown in formula (XIV):

polymers to create the following novel polyol prepolymer chain extenders noted in Table 10.

TABLE 10

| | Examples | | | |
|---|---|---|---|---|
| | 27 | 28 | 29 | 30 |
| IPDA | 300 | — | — | — |
| MXDA | — | 300 | — | — |
| 1,2-Diaminocyclohexane | — | — | 300 | — |
| MPMD | — | — | — | 300 |
| HP 1000 | 100 | 100 | 100 | 100 |

All amounts of the compounds in Table 10 are represented by parts by weight. The reactants are heated to a temperature of 200° F. for 2 hours.

Examples of silicone modified epoxies are given below in Examples 31-34. Comparative example 35 does not include any polyol prepolymer. The following Examples of silicone modified epoxies are given below in Table 11.

TABLE 11

| | Examples | | | | |
|---|---|---|---|---|---|
| | 31 | 32 | 33 | 34 | 35 |
| Polyol prepolymer chain extender of Example 27 | 50 | — | — | — | — |
| Polyol prepolymer chain extender of Example 28 | — | 50 | — | — | — |
| Polyol prepolymer chain extender of Example 29 | — | — | 50 | — | — |
| Polyol prepolymer chain extender of Example 30 | — | — | — | 50 | — |
| IPDA | — | — | — | — | 35 |
| Epoxy 828 | 100 | 100 | 100 | 100 | 100 |
| Gel time (Min) | 30 | 35 | 39 | 40 | 40 |
| Tack Free (Hrs) | 4 | 5 | 4 | 5 | 5 |

All amounts of the compounds in Table 11 are represented by parts by weight. Examples 31 and 35 were placed 16 millimeters on a steel panel and allowed to dry. After 24 hours the samples were tested for adhesion to metal and film integrity. Adhesion results were performed using ASTM #4551 elcometer. After the 24 hour period, Example 31 was fully cured and exhibited 850 PSI on the elcometer pull test.

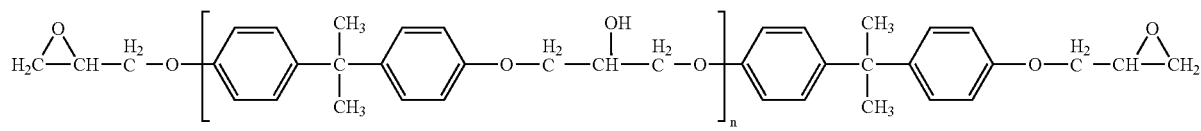
(XIV)

wherein n is preferably between 1 and 25.

The following examples are provided to further illustrate the preferred embodiments of the present invention polyol prepolymer chain extender, but should not be construed as limiting the invention in any way. Compositions of the polyol prepolymer chain extender were produced by mixing the aliphatic and cycloaliphatic amines with an epoxy functional silicone polymer shown in Examples 27-30. The following amines were reacted with the following silicone The film was high in gloss and showed excellent mar resistance. Conversely, after the 24 hour period, Example 35 was not fully cured, marred easily, and exhibited 400 PSI on the elcometer pull test. Also, importantly, the functionality of the silicone hardener becomes 6 from 2 increasing the crosslink density of the epoxy, which increases the chemical resistance of the silicone modified epoxies. The functionality of these polyol prepolymers increases from 2 to 6 for the aliphatic diamines and to 9 with the aliphatic triamines. Examples 32-34 showed similar results to Example 31.

Additional examples of silicone modified epoxies are given below in Examples 36-39. The following Examples of silicone modified epoxies are given below in Table 12.

TABLE 12

|  | Examples | | | |
|---|---|---|---|---|
|  | 36 | 37 | 38 | 39 |
| Polyol prepolymer chain extender of Example 1 | — | — | 60 | — |
| Polyol prepolymer chain extender of Example 2 | — | — | — | 20 |
| Polyol prepolymer chain extender of Example 4 | 50 | 50 | — | 40 |
| Acrylic Oligomer* | 20 | — | 20 | — |
| Coatosil 1211** | 1 | 1 | 1 | 1 |
| Benzyl Alcohol | — | 20 | — | 20 |
| Epoxy 190 EqWT | 80 | 80 | 80 | 80 |
| Gel time (Min) | 35 | 45 | 35 | 60 |
| Tack Free (Hrs) | 4 | 4 | 4 | 8 |

*Acrylic Oligomer manufactured by ReactAmine ® Technology.
**Coatosil 1211 is a special wetting agent to be used when formulating a silicone amine hardener and is manufactured by O.S.I. All amounts of the compounds in Table 12 are represented by parts by weight Generally, the Jeffamine materials are slower reacting with epoxies and the Dytek® materials, such as 1,2-Diaminocyclohexane and 2-Methylpentamethylenediamine, are generally faster reacting with epoxies. To achieve a particular speed of reaction with the epoxies, mixtures of the Jeffamines and the Dytek® materials are combined. For example, IPDA is mixed at a ratio of 3:1 with HP 1000 and then mixed at a ratio of 1:1 with the novel polyol prepolymers of Examples 1, 2, or 4. In another example, TETA is mixed at a ratio of 3:1 with HP 1000 and then mixed at a ratio of 1:1 with the novel polyol prepolymers of Examples 1, 2, or 4. The addition of the epoxy functional silicone improves the hydrophobic and weatherability properties of the epoxies.

In addition, aliphatic amines, such as polyether amines in combination with the cycloaliphatic amines are mixed with epoxies to produce additional silicone modified epoxies. Examples 40-44 of these mixtures of amines are given below in Examples 40-44 in Table 13.

TABLE 13

|  | Examples | | | | |
|---|---|---|---|---|---|
|  | 40 | 41 | 42 | 43 | 44 |
| D230 | 10 | — | — | — | 10 |
| D400 | — | 10 | — | — | — |
| T403 | — | — | 10 | 10 | — |
| T-5000 (Jeffamine) | — | — | — | 5 | 5 |
| IPDA | 30 | 30 | 30 | 30 | 30 |
| MXDA | — | — | — | — | — |
| 1,2-Diaminocyclohexane | — | — | — | — | — |
| MPMD | — | — | — | — | — |
| Epoxy 828 | 100 | 100 | 100 | 100 | 100 |
| Functionality | 2 | 2 | 3 | 3 | 2.5 |
| Gel Time (Min) | 35 | 50 | 30 | 35 | 35 |
| Tack Free (Hrs) | 4 | 8 | 4 | 5 | 4.5 |

All amounts of the compounds in Table 13 are represented by parts by weight. These results show that incorporation of the polyether amine of higher molecular weight combined with the cycloaliphatic amine when reacted with an epoxy resin provide a silicone modified epoxy with improved flexibility to the finish cured film and decreases brittleness typical of other epoxy mixes. Further, all samples still showed a high gloss, excellent adhesion, mar resistance, and excellent UV stability and chemical resistance properties.

The selection of the aliphatic or cycloaliphatic amine to be mixed with the epoxy functional silicone is determined by the desired characteristics of the epoxy and its application.

In another aspect of the present invention, the novel polyol prepolymer chain extenders produce acrylic resins with improved characteristics. In this aspect, the novel polyol prepolymer is reacted with an acrylic monomer, to form an acrylic polymer. Preferably, these acrylic monomers are multi-functional such as trimethylolpropane triacrylate (TMPTA) and pentaerythritol triacrylate (PETA). Other nor-limiting examples of multi-functional monomers include propoxylated (6) trimethylolpropane triacrylate, highly propoxylated (5.5) glyceryl triacrylate, methacrylate ester, trimethylolpropane trimethacrylate, low viscosity trimethylolpropane triacrylate, tris(2-hydroxy ethyl) isocyanurate triacrylate, ethoxylated (20) trimethylolpropane triacrylate, ethoxylated (3) trimethylolpropane triacrylate, propoxylated (3) trimethylolpropane triacrylate, ethoxylated (6) trimethylolpropane acrylate, ethoxylated (9) trimethylolpropane acrylate, propoxylated (3) glyceryl triacrylate, and ethoxylated (15) trimethylolpropane triacrylate. Some non-limiting examples of these multi-functional acrylic monomers are shown in formulas (XV) and (XVI):

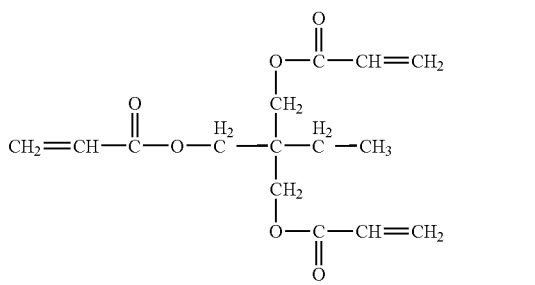

(XV)

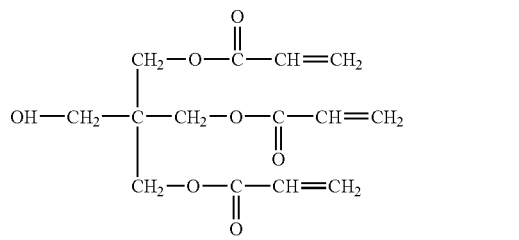

(XVI)

The following examples are provided to further illustrate the preferred embodiments of the present invention polyol prepolymer chain extender, but should not be construed as limiting the invention in any way. The composition of the polyol prepolymer chain extender used in Example 29 is reacted with the following multi-functional acrylic monomers to produce silicone modified acrylics. Some examples of these silicone modified acrylics are given below in Examples 45-47 in Table 14.

TABLE 14

| | Examples | | |
|---|---|---|---|
| | 45 | 46 | 47 |
| Polyol prepolymer chain extender of Example 29 | 50 | 50 | 50 |
| TMPTA | 100 | — | 30 |
| PETA | — | 100 | 50 |
| Gel time (Sec) | 600 | 5 | 300 |

All amounts of the compounds in Table 14 are represented by parts by weight. In addition to these mixtures, additional mixtures of these amines may be mixed with an epoxy functional silicone to produce the novel polyol prepolymer chain extenders. For example, IPDA is mixed at a 3:1 ratio with HP 1000 and then this mixture is mixed in equal parts with 2-Methylpentamethylenediamine. In another example, tetraethyltriamine (TETA) is mixed with the epoxy functional silicone. The present invention provides for these amines to mixed with the epoxy functional silicone individually or these amines may be mixed together and then mixed at a general ratio of 3:1 to the epoxy functional silicone. All samples were clear and had exotherm of 200° F. in 100 gram mass. A 4" disc was cast for each sample and all samples cured to a shore of 80 for hardness.

In another aspect of the present invention, these silicone modified acrylics are used to produce materials, such as solid surface material, with improved characteristics.

The following examples are provided to further illustrate the preferred embodiments of the present invention polyol prepolymer chain extender, but should not be construed as limiting the invention in any way. The composition of the polyol prepolymer chain extender used in Example 29 is reacted with the following multi-functional acrylic monomers and granite mixes to produce improved solid surface materials. Comparative Example 54 is a conventional composition of solid surface material that does not include the polyol prepolymer. Examples of these improved solid surface materials are given below in Examples 48-54 in Table 15.

TABLE 15

| | Examples | | | | | | |
|---|---|---|---|---|---|---|---|
| | 48 | 49 | 50 | 51 | 52 | 53 | 54 |
| Polyol prepolymer chain extender of Example 29 | 50 | 50 | 50 | — | — | — | — |
| 3:1 IPDA/HP 1000 | — | — | — | 50 | — | — | — |
| 3:1 MXDA/HP 1000 | — | — | — | — | 30 | — | — |
| MPMD | — | — | — | — | — | 50 | — |
| TMPTA | 100 | — | 30 | 100 | 100 | 30 | — |
| PETA | — | 100 | 50 | — | — | 50 | — |
| Unsaturated polyesters | — | — | — | — | — | — | 100 |
| Mek P (peroxide catalyst), % | — | — | — | — | — | — | 2 |
| Granite mix | 300 | 300 | 300 | 300 | 300 | 300 | 300 |
| Gel time (Min) | 15 | 7 | 10 | 9 | 12 | 11 | 60 |
| Cure time (Min) | 30 | 15 | 20 | 30 | 30 | 20 | 6–8 Hrs. |

All amounts of the compounds in Table 15 are represented by parts by weight, unless otherwise noted. Examples 48-53 had a high gloss and high impact when dropped. Example 54 broke on impact. Further, there was no odor to Examples 48-53 after curing, however, Example 54 had a strong styrene monomer smell after curing. In addition, Examples 48-53 were subjected to a propane torch and showed no smoke and just formed a black char. Example 54 was subjected to a propane torch and the sample burned and gave off black smoke. Furthermore, Examples 48-53 possessed good mar resistance, whereas Example 54 marred very easily. The gel time and cure time for Examples 51 and 52 were slightly faster than Examples 48-50. Further, when additional filler amounts of granite, such as 400 PBW, were added to Examples 48-53 the silicone modified acrylic resins remained fluid, with lower surface tension, but when this additional amount of granite was added to Example 54, the unsaturated polyester sample became too dry and the unsaturated polyester in unable to wet the filler.

Spray Application

In one aspect of the present invention, a method is included for applying the present invention silicone modified polyurea to a substrate, and more specifically, applying to concrete or steel.

For preparation of old concrete prior to application, sandblasting, shot blasting, or water blasting is highly preferable to remove any surface contaminates. Any oils or fats should be removed prior to application of the silicone modified polyurea. Acid etching may be required (followed by a thorough rinsing) to open the pores of the concrete to accept a primer coat. A primer may be applied, such as Reactamine® Primer from Reactamine Technologies, LLC, to further improve the bonding of the silicone modified polyurea to the concrete. A minimum 40-mil coating is generally preferable for improved chemical and abrasion resistance.

For preparation of new concrete, the concrete should cure for preferably a minimum of 30 days. Also preferably, sand blasting, shot blasting, or acid etching (15% muriatic acid/85% water) is required to remove the surface lattice that appeared during the curing process. Again, a primer, such as Reactamine® Primer, is preferably applied to reduce out gassing of the concrete.

For preparation of steel, the steel must be prepared to a "near white metal" equivalent to SSPC 10 or NACE 2 standards. For immersion service, a 3-mil blast profile is preferable. A 2-mil blast profile is generally recommended. A 10-40 mil coat of Reactamine® Primer is generally preferable for improved chemical resistance performance.

In one aspect, the present invention includes the following spray application. A substrate (concrete, steel, etc.) is preferably prepared as described herein. In one aspect, the B-component is contained in one container and the A-component is contained in another. Into each of these two containers is placed a displacement pump connected to a hose. The respective displacement pump pumps the respective component stored in that container through the respective hose to a separate volumetric cylinder-type measurement devices, which accurately measures the exact amounts of the A-component and B-component. The A-component is measured in one volumetric cylinder-type measurement device and the B-component is measured in another. Preferably, each cylinder measures equal Each volumetric cylinder-type measurement device is then pressurized in the range from 500 psi to 3000 psi. The A-component and the B-component are then separately pumped through a heater which heats each component separately to temperatures from about 50° F. to 250° F. The separated individual components are then pumped through one heated hose for each component and sent to an impingement spray gun.

For example, the present invention silicone modified polyurea is preferably applied to the substrate using a high pressure plural component pump (1:1 by volume), such as a GlasCraft-MX® equipped with a Prober® impingement mix spray gun or a Gusmer® H-20/35 proportioning unit and a Gusmer® GX-7 (400 Series) or GX-8 impingement mix spray gun. As described above, each proportioning unit is preferably capable of supplying the correct pressure and heat for the required hose length on a consistent basis. In addition, the hose is preferably heated to keep the reactants at a temperature of at least 150° F. Preferably, for processing, the block temperature of the heater was set at 160° F. for both the B-component and the A-component and the hose temperature was set at 160° F. for both components. Processing was at 2500 psig static pressure and 2000 psig spray pressure.

SUMMARY

There has been described a novel polyol prepolymer chain extender and silicone modified epoxy and acrylic resins that can be aliphatic. It should be understood that the particular embodiments described within this specification are for purposes of example and should not be construed to limit the invention. Further, it is evident that those skilled in the art may now make numerous uses and modifications of the specific embodiment described, without departing from the inventive concepts. It is also evident that the process steps recited may in some instances be performed in a different order, or equivalent structures and processes may be substituted for the various structures and processes described. The structures and processes may be combined with a wide variety of other structures and processes.

GLOSSARY

| | |
|---|---|
| ETHACURE® 100 | Diethyltoluene diamine chain extender available from Albemarle™ Corporation. |
| JEFFAMINE® D-2000 | A 2000 molecular weight polyoxypropylene diamine available from Huntsman Petrochemical Corporation. |
| JEFFAMINE® T-5000 | A 5000 molecular weight polyoxypropylene triamine available from Huntsman Petrochemical Corporation. |
| SILQUEST® A-187 | Functional alkoxy silane available from OSi Specialties, Inc./Crompton Corp. |
| UNILINK® 4200 | Dialkyl substituted methylene dianiline chain extender available from UOP Chemical Co. |
| Tinuvin® 328 | UV stabilizer available from Ciba-Geigy Corp. |
| Tinuvin® 765 | UV stabilizer available from Ciba-Geigy Corp. |
| Ti-Pure® R-900 | Rutile titanium dioxide available from E.I. DuPont de Nemours Co. |
| Silquest® A-1100 | Gamma-aminopropyltriethoxysilane is an amino-functional coupling agent from OSi Specialties, Inc./Crompton Corp. |
| MDI 1680 | 4,4-Diphenylisocyanate from Huntsman Petrochemical Corp. |
| N-3400 | 1,6-Hexamethylenediisocanate. |
| CoatOSil® 2810 | Epoxy silicone copolymers similar to HP 1000. |
| OSi 2812 | 2000 mwt silicone endcapped diol. |
| NH1220 and NH1420 | Polyaspartic esters from Bayer. |
| AFL-5 and AFL-10 | Aminofunctional poly-dimethylsiloxanes |
| IPDI | Isophorone di-isocyanate |
| HDI | Hexamethyl di-isocyanate |
| TMXDI | Tetramethyl xylene di-isocyante |
| Rubinate® 9484 MDI | Methylene diphenyl isocyanate from Huntsman Petrochemical Corp. |

What is claimed is:

1. A silicone modified acrylic resin comprising:
   a first component which includes at least one polyol prepolymer chain extender which comprises:
      at least one amine;
      at least one epoxy functional silicone; and
   a second component which comprises at least one acrylic monomer.

2. The silicone modified acrylic resin of claim 1 wherein said at least one acrylic monomer is multi-functional.

3. The silicone modified acrylic resin of claim 1 wherein said at least one amine is selected from the group consisting of primary aliphatic amines, primary cycloaliphatic amines, secondary aliphatic amines, or a combination of said amines.

4. The silicone modified epoxy resin of claim 1 wherein said acrylic monomer is selected from the group consisting of trimethylolpropane triacrylate, pentaerythritol triacrylate, propoxylated (6) trimethylolpropane triacrylate, highly propoxylated (5.5) glyceryl triacrylate, methacrylate ester, trimethylolpropane trimethacrylate, low viscosity trimethylolpropane triacrylate, tris(2-hydroxy ethyl) isocyanurate triacrylate, ethoxylated (20) trimethylolpropane triacrylate, ethoxylated (3) trimethylolpropane triacrylate, propoxylated (3) trimethylolpropane triacrylate, ethoxylated (6) trimethylolpropane acrylate, ethoxylated (9) trimethylolpropane acrylate, propoxylated (3) glyceryl triacrylate, and ethoxylated (15) trimethylolpropane triacrylate; and mixtures thereof.

5. The silicone modified acrylic resin of claim 1 wherein said polyol prepolymer chain extender is present in the range of from about 5 to about 85 parts by weight, based on 100 parts by weight of the total silicone modified acrylic resin.

6. The silicone modified acrylic resin of claim 1 wherein said at least on acrylic monomer is present in the range of from about 15 to about 95 parts by weight, based on 100 parts by weight of the total silicone modified acrylic resin.

7. The silicone modified acrylic resin of claim 1 wherein said first component further comprises UV stabilizers.

8. The silicone modified acrylic resin of claim 1 wherein said first component further comprises color pigments.

9. The silicone modified acrylic resin of claim 1 wherein said first component further comprises silane coupling agents.

10. The silicone modified acrylic resin of claim 1 wherein said first component further comprises fire retardants.

11. A solid surface material composition comprising:
    a first component which includes at least one polyol prepolymer chain extender which comprises:
        at least one amine;
        at least one epoxy functional silicone;
    a second component which comprises at least one acrylic monomer; and
    a granite mix.

12. The solid surface material composition of claim 11 wherein said polyol prepolymer is present in the range of from about 5 to about 85 parts by weight, based on 100 parts by weight of the total solid surface material composition.

13. The solid surface material composition of claim 11 wherein said at least one acrylic monomer is present in the range of from about 15 to 95 parts by weight, based on 100 parts by weight of the total solid surface material composition.

14. The solid surface material composition of claim 11 wherein said granite mix is present in the range of from about 40 to about 80 parts by weight, based on 100 parts by weight of the total solid surface material composition.

15. A method of making a silicone modified acrylic resin comprising:
    combining at least one amine selected from the group consisting of primary aliphatic amines, primary cycloaliphatic amines, secondary aliphatic amines, primary aromatic amines, and secondary aromatic amines, and mixtures thereof, with at least one epoxy functional silicone to form a solution, wherein said at least one amine is present in a stoichiometric excess relative to said at least one epoxy functional silicone;
    reacting said solution to form a polyol prepolymer chain extender, wherein said reacting comprises heating said solution at a temperature in the range of from 130° F. to 210° F. for a time period of from 1 hour to 24 hours; and
    mixing said polyol prepolymer chain extender with at least one multi-functional acrylic monomer to form a silicone modified acrylic resin.

* * * * *